United States Patent
Zhang et al.

(10) Patent No.: US 11,238,306 B2
(45) Date of Patent: Feb. 1, 2022

(54) GENERATING VECTOR REPRESENTATIONS OF CODE CAPTURING SEMANTIC SIMILARITY

(71) Applicant: International Business Machines Corporation, Armonk, NY (US)

(72) Inventors: Bo Zhang, Cary, NC (US); Alexander Sobran, Chapel Hill, NC (US); David Wehr, Sigourney, IA (US); Halley Fede, Albany, NY (US); Eleanor Pence, Albany, NY (US); Joseph Hughes, Durham, NC (US); John H. Walczyk, III, Raleigh, NC (US); Guilherme Ferreira, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 16/143,701

(22) Filed: Sep. 27, 2018

(65) Prior Publication Data

US 2020/0104631 A1 Apr. 2, 2020

(51) Int. Cl.
*G06K 9/62* (2006.01)
*G06N 3/08* (2006.01)
(Continued)

(52) U.S. Cl.
CPC ........... *G06K 9/6215* (2013.01); *G06F 40/30* (2020.01); *G06K 9/6256* (2013.01); *G06N 3/08* (2013.01); *G06N 5/022* (2013.01); *G06N 20/00* (2019.01)

(58) Field of Classification Search
CPC .... G06K 9/6215; G06K 9/6256; G06F 40/30; G06N 3/08; G06N 5/022; G06N 20/00; G06N 20/10; G06N 20/20
See application file for complete search history.

(56) References Cited

U.S. PATENT DOCUMENTS 8,819,654 B2   8/2014   Fontenot et al.
9,324,022 B2   4/2016   Williams, Jr. et al.
(Continued)

OTHER PUBLICATIONS

Gu et al., "Deep Code Search," Proceedings of the 40th International Conference on Software Engineering, Gothenburg, Sweden, May 27-Jun. 3, 2018, pp. 933-944.
(Continued)

*Primary Examiner* — Shane D Woolwine
(74) *Attorney, Agent, or Firm* — Robert A. Voigt, Jr.; Winstead PC

(57) ABSTRACT

A method, system and computer program product for obtaining vector representations of code snippets capturing semantic similarity. A first and second training set of code snippets are collected, where the first training set of code snippets implements the same function representing semantic similarity and the second training set of code snippets implements a different function representing semantic dissimilarity. A vector representation of a first and second code snippet from either the first or second training set of code snippets is generated using a machine learning model. A loss value is generated utilizing a loss function that is proportional or inverse to the distance between the first and second vectors in response to receiving the first and second code snippets from the first or second training set of code snippets, respectively. The machine learning model is trained to capture the semantic similarity in the code snippets by minimizing the loss value.

20 Claims, 4 Drawing Sheets

(51) Int. Cl.
*G06N 5/02* (2006.01)
*G06N 20/00* (2019.01)
*G06F 40/30* (2020.01)

(56) References Cited

U.S. PATENT DOCUMENTS

| | | | |
|---|---|---|---|
| 9,378,242 B1 | 6/2016 | Fontenot et al. | |
| 9,852,374 B2 | 12/2017 | Christophe | |
| 2007/0299825 A1* | 12/2007 | Rush | G06F 16/907 |
| 2019/0295227 A1* | 9/2019 | Wang | G06K 9/4628 |

OTHER PUBLICATIONS

White et al., "Deep Learning Code Fragments for Code Clone Detection," 31st IEEE/ACM International Conference on Automated Software Engineering, Singapore, Singapore, Sep. 3-7, 2016, pp. 87-98.

Mou et al., "Convolutional Neural Networks over Tree Structures for Programming Language Processing," Proceedings of the Thirtieth AAAI Conference on Artificial Intelligence, 2016, pp. 1287-1293.

Dam et al., "A Deep Tree-Based Model for Software Defect Prediction," arXiv: 1802.00921, Feb. 3, 2018, pp. 1-10.

Hu et al., "Deep Code Comment Generation," Proceedings of the 26th Conference on Program Comprehension, Gothenburg, Sweden, May 27-28, 2018, pp. 200-210.

Bavota et al., "Identifying Extract Class Refactoring Opportunities Using Structural and Semantic Cohesion Measures," The Journal of Systems and Software, vol. 84, 2011, pp. 397-414.

Anonymous, "Efficient Retargetable Code Generation Using Architecture Description Based on Semantic Primitives in Retargetable Compilers Environment," IP.com No. IPCOM000245161D, Feb. 15, 2016, pp. 1-6.

Carvalho et al., "Conclave: Ontology-Driven Measurement of Semantic Relatedness Between Source Code Elements and Problem Domain Concepts," Proceedings of the 14th International Conference on Computational Science and Its Applications, vol. 8584, Jun. 30-Jul. 3, 2014, pp. 116-131.

* cited by examiner

GENERATING VECTOR REPRESENTATIONS OF CODE CAPTURING SEMANTIC SIMILARITY

TECHNICAL FIELD

The present invention relates generally to analyzing source code using deep learning, and more particularly to generating vector representations of code capturing semantic similarity.

BACKGROUND

Deep learning (also known as deep structured learning or hierarchical learning) is part of a broader family of machine learning methods based on learning data representations as opposed to task-specific algorithms. Learning can be supervised, semi-supervised or unsupervised.

Deep learning architectures, such as deep neural networks, deep belief networks and recurrent neural networks, have been applied to fields including computer vision, speech recognition, natural language processing, audio recognition, social network filtering, machine translation, bioinformatics, drug design and board game programs, where they have produced results comparable to and in some cases superior to human experts.

Deep learning architectures have also been applied to analyzing source code. However, such deep learning architectures do not accurately capture the semantics or meaning of the code. Instead, such deep learning architectures only capture the syntax of the source code, such as the arrangement of the terms in the code.

Capturing the semantics or meaning of the code is important in order to identify the same code implemented in different ways. For example, there are many different ways to write code to perform the same function (e.g., loop function) for a subset of input parameters. However, there is currently no means for identifying such code snippets that are semantically similar.

SUMMARY

In one embodiment of the present invention, a method for obtaining vector representations of code snippets capturing semantic similarity comprises collecting a first training set of code snippets which implement a same function representing semantic similarity. The method further comprises collecting a second training set of code snippets which implement a different function representing semantic dissimilarity. The method additionally comprises generating a vector representation of a first code snippet and a second code snippet by utilizing a machine learning model, where the first and second code snippets are from one of the first and second training sets of code snippets, and where the machine learning model outputs a first vector and a second vector based on the first and second code snippets. Furthermore, the method comprises generating a loss value utilizing a loss function that is proportional to a distance between the first and second vectors in response to receiving the first and second code snippets from the first training set of code snippets. Additionally, the method comprises generating a loss value utilizing the loss function that is inverse to the distance between the first and second vectors in response to receiving the first and second code snippets from the second training set of code snippets. In addition, the method comprises training the machine learning model to generate vector representations of code snippets capturing semantic similarity between the code snippets by minimizing the loss value.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
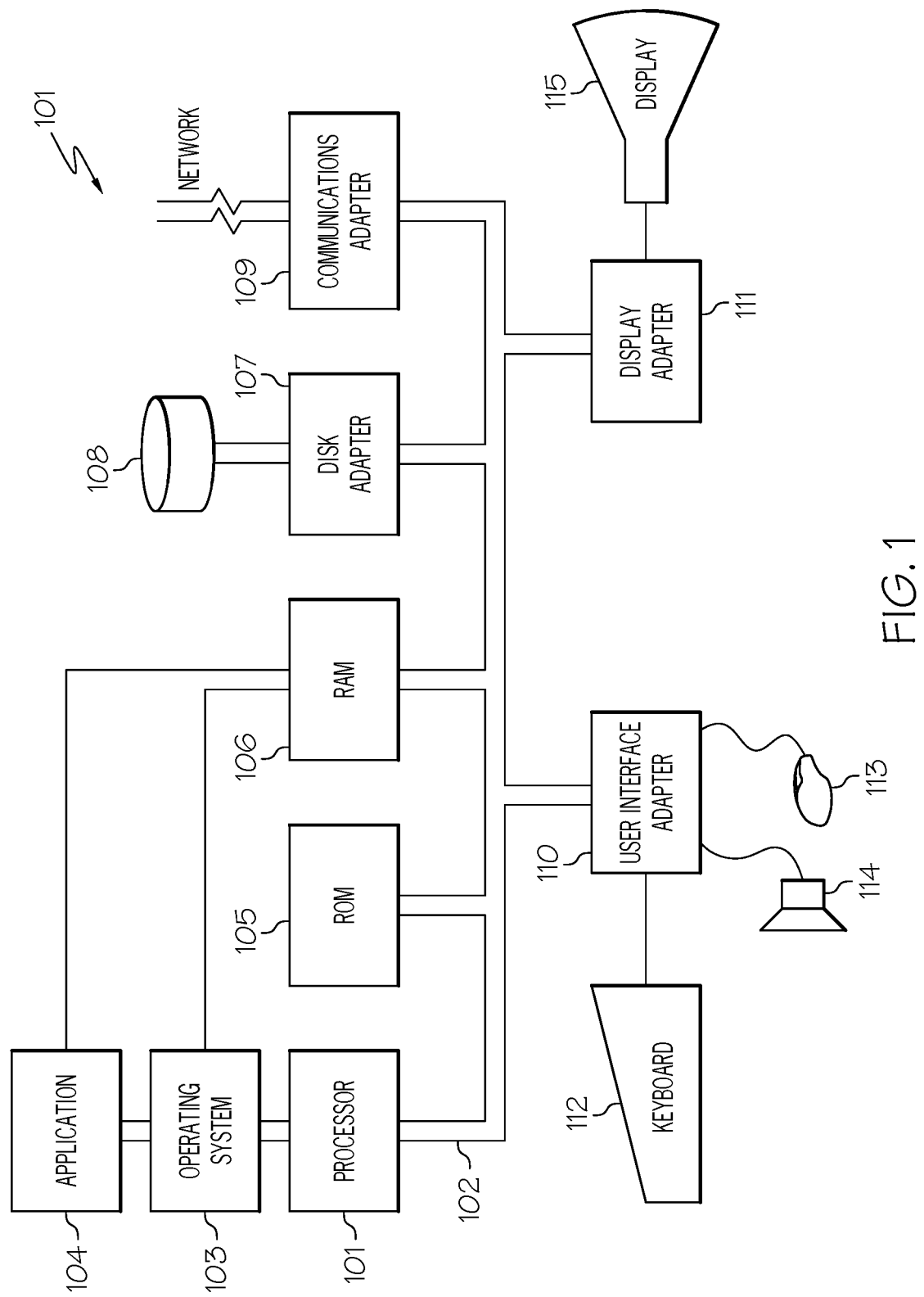
FIG. 1 illustrates an embodiment of the present invention of a hardware configuration of a computing device which is representative of a hardware environment for practicing the present invention.

The present invention comprises a method, system and computer program product for obtaining vector representations of code snippets capturing semantic similarity. In one embodiment of the present invention, a first and a second training set of code snippets are collected, where the first training set of code snippets implement the same function (e.g., loop function) representing semantic similarity and the second training set of code snippets implement a different function representing semantic dissimilarity. A vector representation of a first and a second code snippet from either the first or second training set of code snippets is generated by utilizing a machine learning model. The machine learning model may vectorize the code snippets into vector format (e.g., column format), such as by using a machine learning algorithm, such as Doc2vec or Word2vec. For example, the machine learning algorithm maps the determined semantic meaning of the code snippets to vectors. Such information is vectorized into vector format using such a machine learning algorithm. A loss value is then generated utilizing a loss function that is proportional to a distance between the first and second vectors in response to receiving the first and second code snippets from the first training set of code snippets or is the inverse to the distance between the first and second vectors in response to receiving the first and second code snippets from the second training set of code snippets. By generating a loss value that is the inverse to the distance between the vectors when the code snippets implement a different function (semantic dissimilarity) and generating a loss value that is proportional to the distance between the vectors when the code snippets implement the same function (semantic similarity), the machine learning model is being trained to capture the semantic similarity in the code snippets by minimizing the loss value. After training the machine learning model to capture the semantics or meaning of the code snippets based on the generated vectors, where the distance between the vectors indicates the degree of semantic similarity between the code snippets, the trained machine learning model generates a vector representation of newly received code snippets that accurately captures the semantic similarity between these newly received code snippets. In this manner, the present invention is able to capture the semantic similarity between code snippets thereby being able to identify code snippets that are semantically similar.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Referring now to the Figures in detail, FIG. 1 illustrates an embodiment of the present invention of the hardware configuration of a computing device 100 which is representative of a hardware environment for practicing the present invention. Computing device 100 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of obtaining vector representations of code snippets representing semantic similarity. Referring to FIG. 1, computing device 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, a program for obtaining vector representations of code snippets capturing semantic similarity as discussed further below in connection with FIGS. 2-4.

Referring again to FIG. 1, read-only memory ("ROM") 105 may be coupled to system bus 102 and include a basic input/output system ("BIOS") that controls certain basic functions of computing device 100. Random access memory ("RAM") 106 and disk adapter 107 may also be coupled to system bus 102. It should be noted that software components including operating system 103 and application 104 may be loaded into RAM 106, which may be computing device's 100 main memory for execution. Disk adapter 107 may be an integrated drive electronics ("IDE") adapter that communicates with a disk unit 108, e.g., disk drive. It is noted that the program for obtaining vector representations of code snippets capturing semantic similarity, as discussed further below in connection with FIGS. 2-4, may reside in disk unit 108 or in application 104.

Computing device 100 may further include a communications adapter 109 coupled to bus 102. Communications adapter 109 may interconnect bus 102 with an outside network thereby allowing computing device 100 to communicate with other devices.

I/O devices may also be connected to computing device 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computing device 100 through keyboard 112 or mouse 113 and receiving output from computing device 100 via display 115 or speaker 114. Other input mechanisms may be used to input data to computing device 100 that are not shown in FIG. 1, such as display 115 having touch-screen capability and keyboard 112 being a virtual keyboard. Computing device 100 of FIG. 1 is not to be limited in scope to the elements depicted in FIG. 1 and may include fewer or additional elements than depicted in FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, deep learning architectures have also been applied to analyzing source code. However, such deep learning architectures do not accurately capture the semantics or meaning of the code. Instead, such deep learning architectures only capture the syntax of the source code, such as the arrangement of the terms in the code. Capturing the semantics or meaning of the code is important in order to identify the same code implemented in different ways. For example, there are many different ways to write code to perform the same function (e.g., loop function) for a subset of input parameters. However, there is currently no means for identifying such code snippets that are semantically similar.

Figure 2:
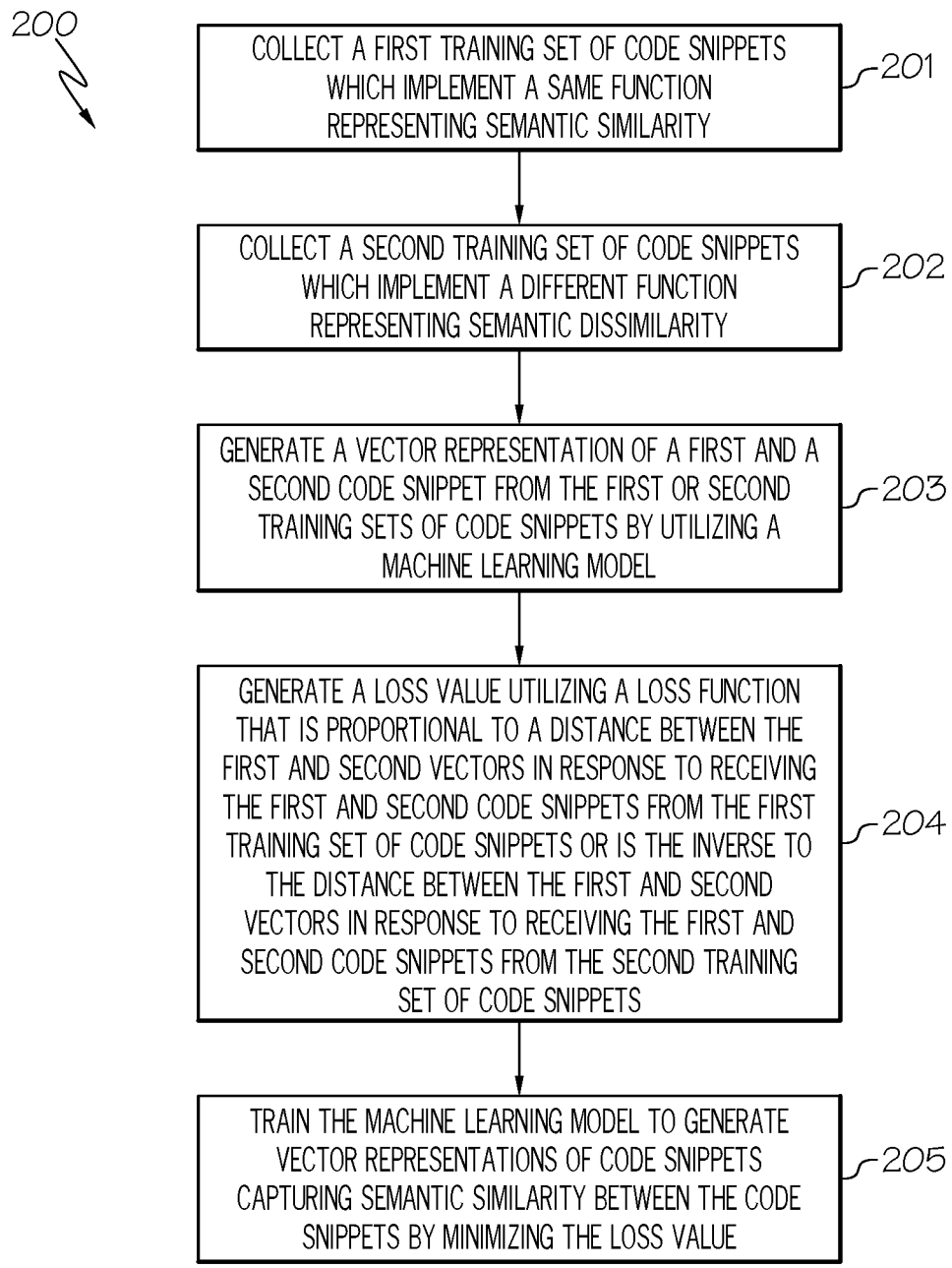
FIG. 2 is a flowchart of a method for training a machine learning model to generate vector representations of code snippets capturing the semantic similarity of these code snippets in accordance with an embodiment of the present invention.
Figure 3:
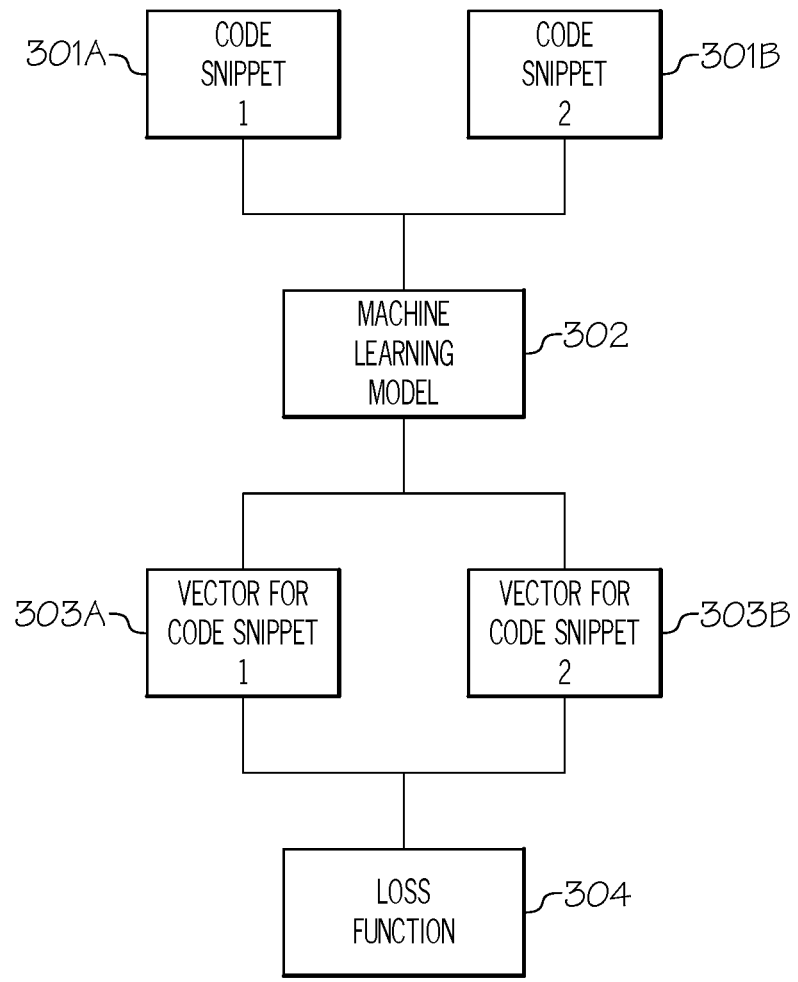
FIG. 3 is a schematic illustrating the training of the machine learning model in accordance with an embodiment of the present invention.
Figure 4:
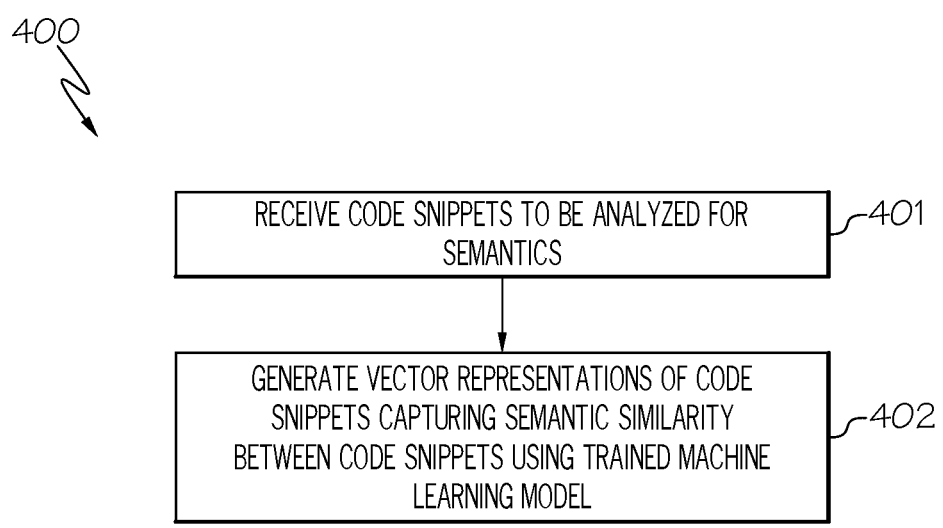
FIG. 4 is a flowchart of a method for utilizing the trained machine learning model to generate vector representations of newly received code snippets capturing the semantic similarity of these code snippets in accordance with an embodiment of the present invention.

The embodiments of the present invention provide a means for identifying code snippets that are semantically similar by training a machine learning model to generate vector representations of code snippets capturing the semantics or meaning of the code snippets as discussed further below in connection with FIGS. 2-4. FIG. 2 is a flowchart of a method for training a machine learning model to generate vector representations of code snippets capturing the semantic similarity of these code snippets. FIG. 3 is a schematic illustrating the training of the machine learning model. FIG. 4 is a flowchart of a method for utilizing the trained machine learning model to generate vector representations of newly received code snippets capturing the semantic similarity of these code snippets.

As stated above, FIG. 2 is a flowchart of a method 200 for training a machine learning model to generate vector representations of code snippets capturing the semantic similarity of these code snippets in accordance with an embodiment of the present invention. Furthermore, as stated above, FIG. 3 is a schematic illustrating the training of the machine learning model in accordance with an embodiment of the present invention. FIG. 2 will discussed below in conjunction with FIG. 3.

Referring to FIG. 2, in conjunction with FIGS. 1 and 3, in step 201, computing device 100 collects a first training set of code snippets which implement the same function (e.g., loop function) representing semantic similarity. "Semantic similarity," as used herein, refers to code snippets performing the same function using a subset of input parameters. For example, various code snippets may be collected that perform the same loop function written in different manners, such as via the "for loop" or via the "while loop." In one embodiment, such a training set of code snippets is obtained via programing competitions or via synthesizing code. For example, such code snippets performing the same function representing semantic similarity may be synthetically obtained by applying patterns, such as converting the "for loop" to a "while loop" or converting "a<b" to "!(b<=a)."

In step 202, computing device 100 collects a second training set of code snippets which implement a different function representing semantic dissimilarity. "Semantic dissimilarity," as used herein, refers to code snippets performing a different function using a subset of input parameters.

For example, various code snippets may be collected that perform a different loop function with the same input parameters. In one embodiment, such a training set of code snippets is obtained via programing competitions or via synthesizing code.

In step 203, computing device 100 generates a vector representation of a first and a second code snippet from the first or second training sets of code snippets by utilizing a machine learning model as shown in FIG. 3.

Referring to FIG. 3, code snippet 1 301A and code snippet 2 301B are inputted to a machine learning model 302 that generates a vector representation of code snippets 1, 2 consisting of vector 1 (vector for code snippet 1) 303A and vector 2 (vector for code snippet 2) 303B, respectively. In one embodiment, machine learning model 302 is configured to vectorize the code snippets received from either the first or second training set of code snippets. "Vectorization," as used herein, refers to transforming the language of the code snippets into vector format (e.g., column format). In one embodiment, the language of the code snippets is vectorized using a machine learning algorithm, such as Doc2vec or Word2vec. For example, the machine learning algorithm maps the determined semantic meaning of the code snippets to vectors. Such information is vectorized into vector format using such a machine learning algorithm, which may reside in application 104 of computing device 100.

In one embodiment, machine learning model 302 generates a fixed-sized vector, where the vector is a real-valued vector of n dimensions, where n is a positive number.

Returning to FIG. 2, in conjunction with FIGS. 1 and 3, in step 204, computing device 100 generates a loss value utilizing a loss function that is proportional to a distance between the first and second vectors 303A, 303B in response to receiving the first and second code snippets 301A, 301B from the first training set of code snippets or generates a loss value utilizing the loss function that is the inverse to the distance between the first and second vectors 303A, 303B in response to receiving the first and second code snippets 301A, 301B from the second training set of code snippets as shown in FIG. 3.

Referring to FIG. 3, vectors 303A, 303B are inputted to a loss function 304 that generates a loss value that is proportional to the distance between vectors 303A, 303B when vectors 303A, 303B are vector representations of the code snippets received from the first training set of code snippets as discussed in step 201 or generates a loss value that is the inverse to the distance between vectors 303A, 303B when vectors 303A, 303B are vector representations of the code snippets received from the second training set of code snippets as discussed in step 202.

In one embodiment, the distance between the vectors (vectors 303A, 303B) corresponds to an angular distance, a Euclidean distance or a Manhattan distance. Such types of distances are exemplary and the principles of the present invention are not to be limited to such exemplary distance measurements.

By generating a loss value that is the inverse to the distance between vectors 303A, 303B when code snippets 301A, 301B implement a different function (semantic dissimilarity) and generating a loss value that is proportional to the distance between vectors 303A, 303B when code snippets 301A, 301B implement the same function (semantic similarity), machine learning model 302 is being trained to capture the semantic similarity in the code snippets by minimizing the loss value as discussed below. That is, machine learning model 302 is trained to recognize code snippets implementing the same function (semantic similarity) by minimizing the loss value as discussed below.

Returning to FIG. 2, in conjunction with FIGS. 1 and 3, in step 205, computing device 100 trains machine learning model 302 to accurately capture the semantic similarity between the code snippets based on the distance between the vector representations of the code snippets by minimizing the loss value.

After training machine learning model 302 to capture the semantics or meaning of the code snippets based on the generated vectors, where the distance between the vectors indicates the degree of semantic similarity between the code snippets, computing device 101 is able to utilize the trained machine learning model 302 to generate vector representations of newly received code snippets capturing the semantic similarity of these code snippets as discussed below in connection with FIG. 4.

FIG. 4 is a flowchart of a method 400 for utilizing the trained machine learning model to generate vector representations of newly received code snippets capturing the semantic similarity of these code snippets in accordance with an embodiment of the present invention.

Referring to FIG. 4, in conjunction with FIGS. 1-3, in step 401, computing device 101 receives code snippets (e.g., new set of code snippets 301A, 301B) to be analyzed for semantics (meaning).

In step 402, computing device 101 generates the vector representations of the code snippets capturing the semantic similarity between the code snippets using the trained machine learning model 302, where the distance between the vectors represents the degree of semantic similarity. The closer the distance between the vectors the more the code snippets have similar semantics (meaning). That is, the shorter the distance between the vectors, the greater the semantic similarity between the code snippets. Conversely, the greater the distance between the vectors, the greater the semantic dissimilarity between the code snippets.

In this manner, the embodiments of the present invention are able to capture the semantic similarity between the code snippets thereby being able to identify code snippets that are semantically similar.

Furthermore, the present invention improves the technology or technical field involving software analysis. As discussed above, deep learning architectures have been applied to analyzing source code. However, such deep learning architectures do not accurately capture the semantics or meaning of the code. Instead, such deep learning architectures only capture the syntax of the source code, such as the arrangement of the terms in the code. Capturing the semantics or meaning of the code is important in order to identify the same code implemented in different ways. For example, there are many different ways to write code to perform the same function (e.g., loop function) for a subset of input parameters. However, there is currently no means for identifying such code snippets that are semantically similar.

The present invention improves such technology by training a machine learning model to be able to capture the semantics (meaning) of the code snippets thereby being able to effectively identify code snippets that are semantically similar. By being able to effectively identify code snippets that are semantically similar, there is an improvement in the technical field of software analysis.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for obtaining vector representations of code snippets capturing semantic similarity, the method comprising:
   collecting a first training set of code snippets which implement a same function representing semantic similarity;
   collecting a second training set of code snippets which implement a different function representing semantic dissimilarity;
   generating a vector representation of a first code snippet and a second code snippet by utilizing a machine learning model, wherein said first and second code snippets are from one of said first and second training sets of code snippets, wherein said machine learning model outputs a first vector and a second vector based on said first and second code snippets;
   generating a loss value utilizing a loss function that is proportional to a distance between said first and second vectors in response to receiving said first and second code snippets from said first training set of code snippets;
   generating a loss value utilizing said loss function that is inverse to said distance between said first and second vectors in response to receiving said first and second code snippets from said second training set of code snippets; and
   training said machine learning model to generate vector representations of code snippets capturing semantic similarity between said code snippets by minimizing said loss value.

2. The method as recited in claim 1 further comprising:
   receiving a new set of code snippets; and
   generating vector representations of said new set of code snippets capturing semantic similarity between said new set of code snippets using said trained machine learning model.

3. The method as recited in claim 2, wherein said new set of code snippets comprises a third code snippet and a fourth code snippet, where said vector representations of said new set of code snippets comprise a third vector and a fourth vector, wherein a distance between said third and fourth vectors represents a degree of semantic similarity between said third and fourth code snippets.

4. The method as recited in claim 1, wherein said first or second training sets of code snippets are obtained via programming competitions or by synthesizing code.

5. The method as recited in claim 1, wherein said distance comprises one of the following distances: angular, Euclidean, and Manhattan.

6. The method as recited in claim 1, wherein said first and second vectors correspond to a real-valued vector of n dimensions, where n is a positive number.

7. The method as recited in claim 1, wherein said first training set of code snippets implements said same function for a subset of input parameters.

8. A computer program product for obtaining vector representations of code snippets capturing semantic similarity, the computer program product comprising a computer readable storage medium having program code embodied therewith, the program code comprising the programming instructions for:
   collecting a first training set of code snippets which implement a same function representing semantic similarity;
   collecting a second training set of code snippets which implement a different function representing semantic dissimilarity;
   generating a vector representation of a first code snippet and a second code snippet by utilizing a machine learning model, wherein said first and second code snippets are from one of said first and second training sets of code snippets, wherein said machine learning model outputs a first vector and a second vector based on said first and second code snippets;
   generating a loss value utilizing a loss function that is proportional to a distance between said first and second vectors in response to receiving said first and second code snippets from said first training set of code snippets;
   generating a loss value utilizing said loss function that is inverse to said distance between said first and second vectors in response to receiving said first and second code snippets from said second training set of code snippets; and
   training said machine learning model to generate vector representations of code snippets capturing semantic similarity between said code snippets by minimizing said loss value.

9. The computer program product as recited in claim 8, wherein the program code further comprises the programming instructions for:
   receiving a new set of code snippets; and
   generating vector representations of said new set of code snippets capturing semantic similarity between said new set of code snippets using said trained machine learning model.

10. The computer program product as recited in claim 9, wherein said new set of code snippets comprises a third code snippet and a fourth code snippet, where said vector representations of said new set of code snippets comprise a third vector and a fourth vector, wherein a distance between said third and fourth vectors represents a degree of semantic similarity between said third and fourth code snippets.

11. The computer program product as recited in claim 8, wherein said first or second training sets of code snippets are obtained via programming competitions or by synthesizing code.

12. The computer program product as recited in claim 8, wherein said distance comprises one of the following distances: angular, Euclidean, and Manhattan.

13. The computer program product as recited in claim 8, wherein said first and second vectors correspond to a real-valued vector of n dimensions, where n is a positive number.

14. The computer program product as recited in claim 8, wherein said first training set of code snippets implements said same function for a subset of input parameters.

15. A system, comprising:
a memory for storing a computer program for obtaining vector representations of code snippets capturing semantic similarity; and
a processor connected to said memory, wherein said processor is configured to execute the program instructions of the computer program comprising:
- collecting a first training set of code snippets which implement a same function representing semantic similarity;
- collecting a second training set of code snippets which implement a different function representing semantic dissimilarity;
- generating a vector representation of a first code snippet and a second code snippet by utilizing a machine learning model, wherein said first and second code snippets are from one of said first and second training sets of code snippets, wherein said machine learning model outputs a first vector and a second vector based on said first and second code snippets;
- generating a loss value utilizing a loss function that is proportional to a distance between said first and second vectors in response to receiving said first and second code snippets from said first training set of code snippets;
- generating a loss value utilizing said loss function that is inverse to said distance between said first and second vectors in response to receiving said first and second code snippets from said second training set of code snippets; and
- training said machine learning model to generate vector representations of code snippets capturing semantic similarity between said code snippets by minimizing said loss value.

16. The system as recited in claim 15, wherein the program instructions of the computer program further comprise:
- receiving a new set of code snippets; and
- generating vector representations of said new set of code snippets capturing semantic similarity between said new set of code snippets using said trained machine learning model.

17. The system as recited in claim 16, wherein said new set of code snippets comprises a third code snippet and a fourth code snippet, where said vector representations of said new set of code snippets comprise a third vector and a fourth vector, wherein a distance between said third and fourth vectors represents a degree of semantic similarity between said third and fourth code snippets.

18. The system as recited in claim 15, wherein said first or second training sets of code snippets are obtained via programming competitions or by synthesizing code.

19. The system as recited in claim 15, wherein said distance comprises one of the following distances: angular, Euclidean, and Manhattan.

20. The system as recited in claim 15, wherein said first and second vectors correspond to a real-valued vector of n dimensions, where n is a positive number.

* * * * *